(12) United States Patent
Eyrainer et al.

(10) Patent No.: US 6,224,091 B1
(45) Date of Patent: May 1, 2001

(54) INFLATABLE PROTECTION DEVICE FOR PROTECTING HEAD AND CHEST AREAS OF PASSENGERS IN AN AUTOMOBILE DURING A SIDE COLLISION

(75) Inventors: Heinz Eyrainer, Waldstetten; Michael Stütz, Spraitbach, both of (DE)

(73) Assignee: TRW Occupant Restraint Systems GmbH & Co. KG, Alfolorf (DE)

( * ) Notice: Subject to any disclaimer, the term of this patent is extended or adjusted under 35 U.S.C. 154(b) by 0 days.

(21) Appl. No.: 09/319,681

(22) PCT Filed: Oct. 5, 1998

(86) PCT No.: PCT/EP98/06333
§ 371 Date: Jun. 9, 1999
§ 102(e) Date: Jun. 9, 1999

(87) PCT Pub. No.: WO99/19173
PCT Pub. Date: Apr. 22, 1999

(30) Foreign Application Priority Data

Oct. 15, 1997 (DE) ............................................. 297 18 305 U

(51) Int. Cl.[7] .................................................. B60R 21/22
(52) U.S. Cl. ........................................ 280/730.2; 280/749
(58) Field of Search ............................... 280/730.2, 730.1, 280/728.2, 749, 729

(56) References Cited

U.S. PATENT DOCUMENTS

| | | | |
|---|---|---|---|
| 5,462,308 | * 10/1995 | Seki et al. ............................ | 280/749 |
| 5,791,683 | * 8/1998 | Shibata et al. ..................... | 280/730.2 |
| 5,884,937 | * 3/1999 | Yamada ............................. | 280/730.2 |
| 5,921,575 | * 7/1999 | Kretschmer et al. ............. | 280/728.2 |
| 5,924,723 | * 7/1999 | Brantman et al. ................ | 280/730.2 |
| 5,957,487 | * 9/1999 | Stutz ................................... | 280/730.2 |
| 6,042,141 | * 3/2000 | Welch et al. ......................... | 280/729 |
| 6,079,732 | * 6/2000 | Nakajima et al. ................ | 280/728.2 |
| 6,082,761 | * 7/2000 | Kato et al. ......................... | 280/730.2 |

FOREIGN PATENT DOCUMENTS

| | | |
|---|---|---|
| 19647679 | 6/1997 | (DE) . |
| 2278812 | 12/1994 | (GB) . |

* cited by examiner

Primary Examiner—Lanna Mai
Assistant Examiner—Lynda Jasmin
(74) Attorney, Agent, or Firm—Tarolli, Sundheim, Covell, Tummino & Szabo L.L.P.

(57) ABSTRACT

An airbag device for a motor vehicle which includes an airbag (20) consisting of an inflatable gas cushion, a gas generator (26) for filling the airbag (20), a gas conduit tube (18) extending through a divided-off portion of the airbag, exhaust ports in the gas conduit tube (18), a profiled ledge (10) having an ejection channel configured therein and in which the airbag (20) arranged in stacked folds is accommodated along with the gas conduit tube (18), and fasteners for holding the modular unit comprised of the profiled ledge (10), the airbag (20) and the gas conduit tube (18).

22 Claims, 5 Drawing Sheets

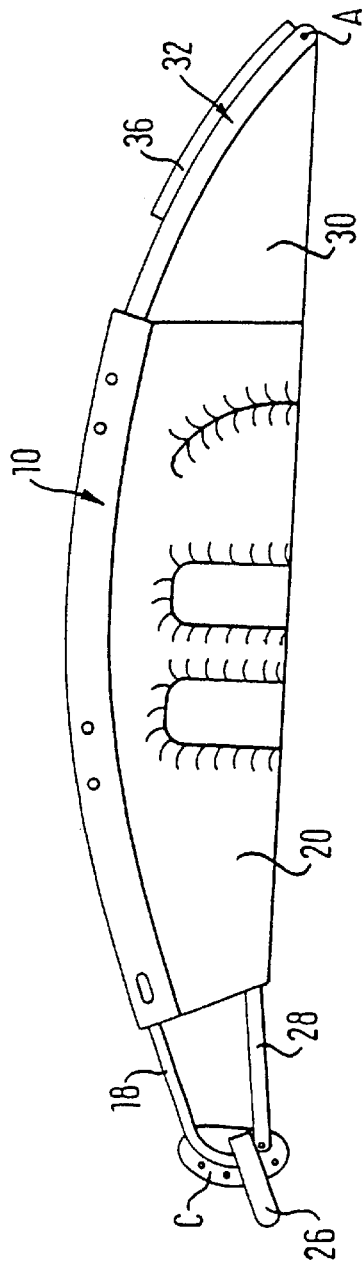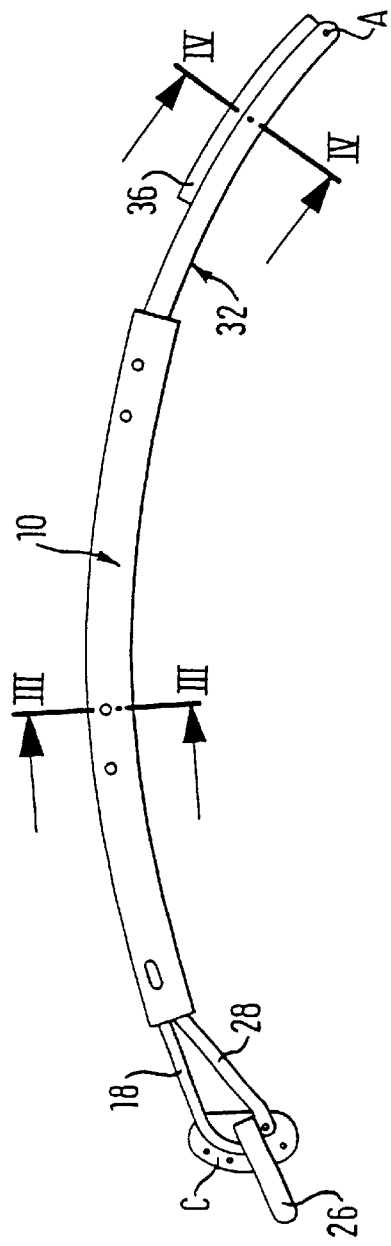

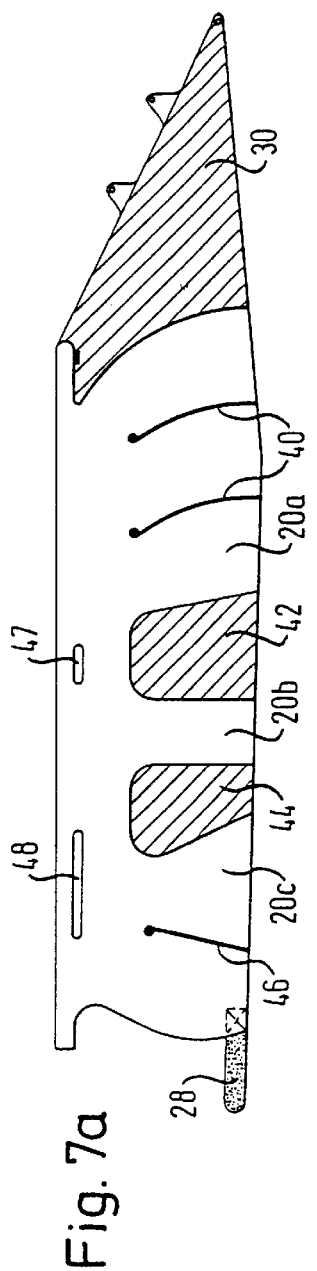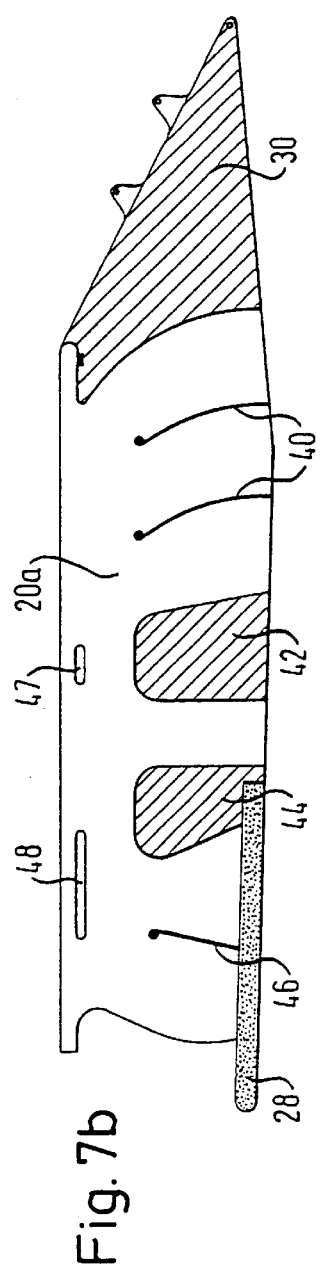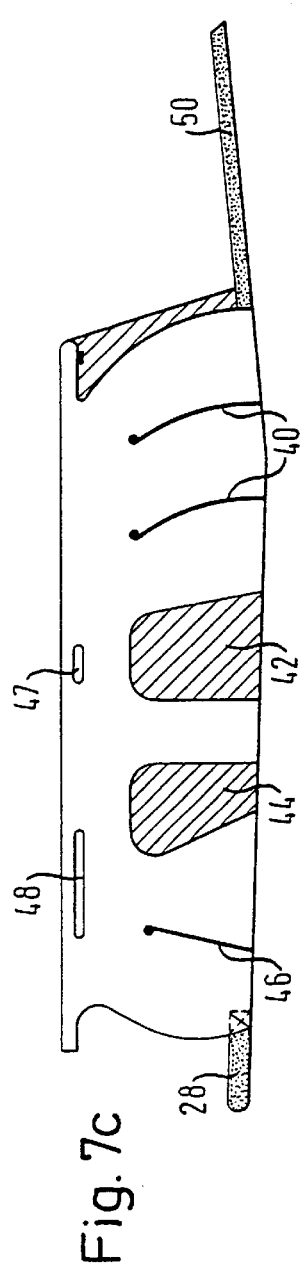

INFLATABLE PROTECTION DEVICE FOR PROTECTING HEAD AND CHEST AREAS OF PASSENGERS IN AN AUTOMOBILE DURING A SIDE COLLISION

The invention relates to an inflatable vehicle occupant protective means for head and thorax side impact protection. A protective means of this kind is already known from German utility model 296 05 896.3 comprising a gas bag extending in the activated condition between the A pillar and the C pillar of a vehicle and covering the majority of the side panes thereof.

The present invention involves efficient series production, expedient accommodation and functional optimization of such a protective means in the vehicle. In accordance with the invention the protective means comprises an elongated receiving housing of channel-shaped cross-section and at least one inflatable gas bag stowable folded in the receiving housing. Extending within the gas bag over at least a substantial part of its length is a gas inlet tube connected to a source of compressed gas. This gas inlet tube is provided with a plurality of gas exit ports distributed over its length. The channel-shaped cross-section consists of a first flat leg, a second leg consisting of two flat, angled strips, and a web joining the two legs to each other. Furthermore, the first strip of the second leg has a lesser width than the first leg, and the second strip is oriented obliquely relative to the free longitudinal edge of the first leg. The elongated receiving housing can be accommodated in the vehicle along the roof edge under a cladding. The folded gas bag is held together in the folded condition in the interior of the receiving housing. The longer, flat leg of the receiving housing adjoins the vehicle body; the second strip of the second leg oriented obliquely to the free longitudinal edge of the first leg forms a closure flap which can be spread open, need not be connected to the first leg and which solely by its stiffness holds the folded gas bag in the interior of the receiving housing. For introducing the folded gas bag into the interior of the receiving housing the legs thereof can be spread apart, these moving elastically back into place to encompass the gas bag after it has been introduced into the receiving housing. When the gas bag is inflated the legs of the receiving housing are spread apart by the expansion pressure of the gas bag to allow the gas bag to emerge. In this action the second strip of the second leg serving as the elastic closure flap forces the gas bag downwards, preventing it from expanding towards the vehicle occupant into the interior of the vehicle. Accordingly, due to the configuration of the receiving housing an orienting effect is achieved which is of major significance for the expansion behaviour of the gas bag.

The receiving housing is fabricated preferably as an injection molded part of a thermoplastics material, permitting efficient series production whilst ensuring good mechanical properties, more particularly also as regards the spreading behaviour of the two legs of the receiving housing and the thereby achieved orienting effect.

In a particularly advantageous further embodiment of the invention a flat profile part is provided in the elongation of the receiving housing, a slot-shaped receiving conduit being formed in this flat profile part for a folded projection of the gas bag and/or a tensioning strap. The profile part may be configured flat, because the sail-type (non-inflatable) projection on the gas bag can be folded together in a few layers. It is especially of advantage when the flat profile part is integrally formed with a receiving conduit having a generally U-shaped cross-section. Wiring, cable pulls, water drain tubes and the like can be installed in this receiving conduit.

Further features and advantages read from the attached sub-claims as well as from the following description of several embodiments with reference to the drawings in which:

FIG. 1 shows a first embodiment of the protective means in the condition ready for fitting;

FIG. 2 shows the protective means as shown in FIG. 1 in the activated condition;

FIGS. 7a to 7c are three design variants of the gas bag of the protective means;

The vehicle occupant protective means shown in FIG. 1 as a module ready for fitting has an elongated, curved shape, corresponding to the profile of the roof edge in a vehicle. The protective means extends in the vehicle between the A pillar and the C pillar, it not being necessary, however, that the total surface area of the side panes between the A pillar and the C pillar is covered by an inflatable gas bag.

Figure 3:
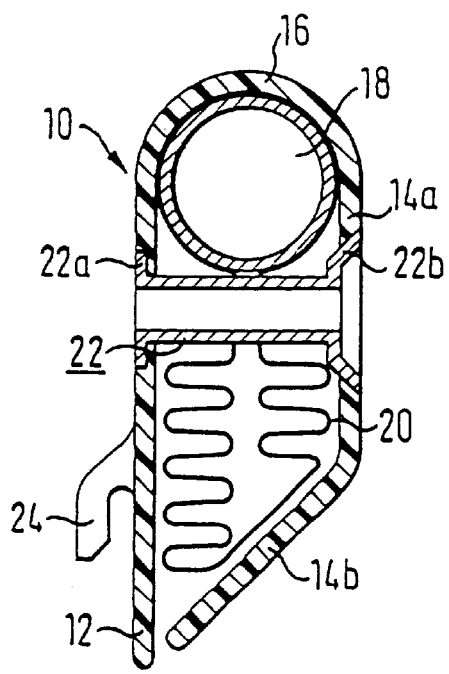
FIG. 3 is a section view along the line III—III in FIG. 1.

One significant component of the protective means is an elongated receiving housing 10 having a channel-shaped cross-section. Details of the cross-sectional shape of the receiving housing 10 are evident from FIG. 3. This receiving housing consists of a first flat leg 12, a second opposite leg comprising a first flat strip 14a and a second strip 14b adjoining the latter at an angle, and a web 16 connecting the two legs. The web 16 is curved and adapted to the outer contour of a gas inlet tube 18 resting against the inner surface of the web 16 and extending over practically the full length of the receiving housing 10. The strip 14a is oriented parallel to the leg 12 whilst the strip 14b runs obliquely relative to the free edge of the leg 12. The receiving housing 10 is fabricated preferably by injection molding from a thermoplastics material, this ensuring optimum mechanical properties in facilitated and efficient series production, more particularly, a behaviour as regards stiffness and elastic deformation which is reproducible over a broad temperature range.

In the interior of the receiving housing 10 a gas bag 20 is stowed in the folded condition. In this condition the gas bag 20 is held by the strip 14b of the second housing leg. This strip forms a deflectable closure flap, the stiffness of which ensures, even without being directly connected to the opposite leg 12, that the folded gas bag 20 remains enclosed.

For installing the receiving housing in the vehicle use is made to advantage of the fasteners needed and provided in any case for two grab handles. These grab handles are usually secured by studs to the roof edge of the vehicle. To enable the studs to pass through the receiving housing 10 transversely, two lead-through sleeves 22 are provided for each grab handle, these lead-through sleeves passing through the receiving housing 10 perpendicular to the leg 12 and the strip 14a of the second housing leg. On the side of the leg 12 the lead-through sleeve 22 is provided with a flange 22a recessed in the leg 12. On the opposite side the lead-through sleeve 22 is provided with a widened portion 22b let in flush in the strip 14a of the second housing leg. The lead-through sleeve 22 forms a spacer receiving the axial forces applied by the stud passing through this sleeve and serving to secure the receiving housing under the roof edge as well as to secure the grab handle (not shown). A further function of the lead-through sleeves 22 is to maintain the gas inlet tube 18 in contact with the inner surface of the curved web 16.

To facilitate installation, hook-shaped hang-in elements 24 are molded on that side of the leg 12 which comes into contact with the roof edge. These elements reach behind corresponding edges of the roof structure to suitably position the elongated receiving housing so that subsequently all that is needed is to screw in the studs for securing the grab handles through the lead-through sleeves 22.

As evident from FIG. 2, in its activated, inflated condition the gas bag 20 does not extend over the full length of the protective means, it instead covering the portion between the A pillar and C pillar in the vehicle where there is a risk of injury to the front and rear vehicle occupants due to side impact. The length of the receiving housing 10 is adapted to the longitudinal extent of the gas bag 20. The gas inlet tube 18 extends from the rear end of the receiving housing 10 up to the portion of the C pillar where the source of compressed gas 26 is arranged.

The rear end of the gas bag 20 adjacent to the C pillar in the vehicle is connected to the C pillar by a tensioning strap 28. At its front end adjacent to the A pillar the gas bag 20 comprises a sail-type projection 30, generally triangular in shape, corresponding to the triangular shape at the front end of the side pane in the vehicle. The front end of this projection 30 is anchored to the A pillar.

Figure 4:
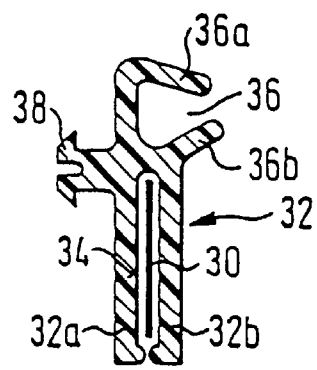
FIG. 4 is a section view along the line IV—IV in FIG. 1.

To receive the sail-type projection 30 on the gas bag 20, a flat profile part 32 is provided in the elongation of the receiving housing 10. The cross-sectional shape of this profile part 32 is evident from FIG. 4. Between two flat, parallel wings 32a, 32b a slot-shaped receiving conduit 34 is formed in which the sail-type projection 30 of the gas bag 20 is received folded in a few layers. Molded on the profile part 32 is a receiving conduit 36 generally U-shaped in cross-section. This receiving conduit 36 is defined by two converging but elastically deflectable legs 36a, 36b. Wiring, a water drain passage or the like may be installed in the receiving conduit 36 which extends over only part of the length of the profile part 32. For fitting the profile part 32 to the vehicle several latching pins 38 are molded in place, to be inserted into corresponding holes provided along the roof edge of the vehicle.

Figure 5:
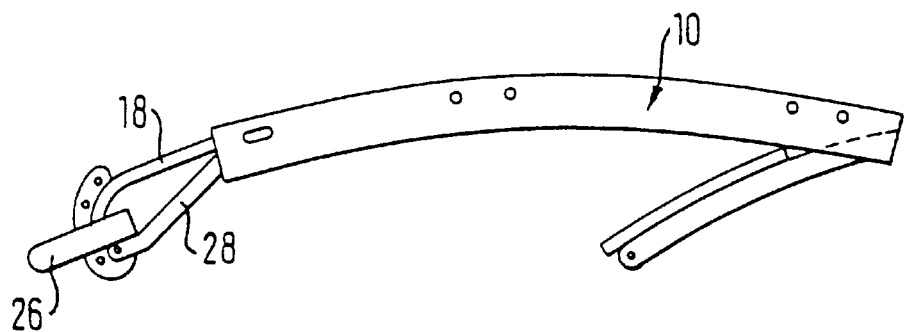
FIG. 5 is a schematic side view of the protective means in the transportable condition.
Figure 6:
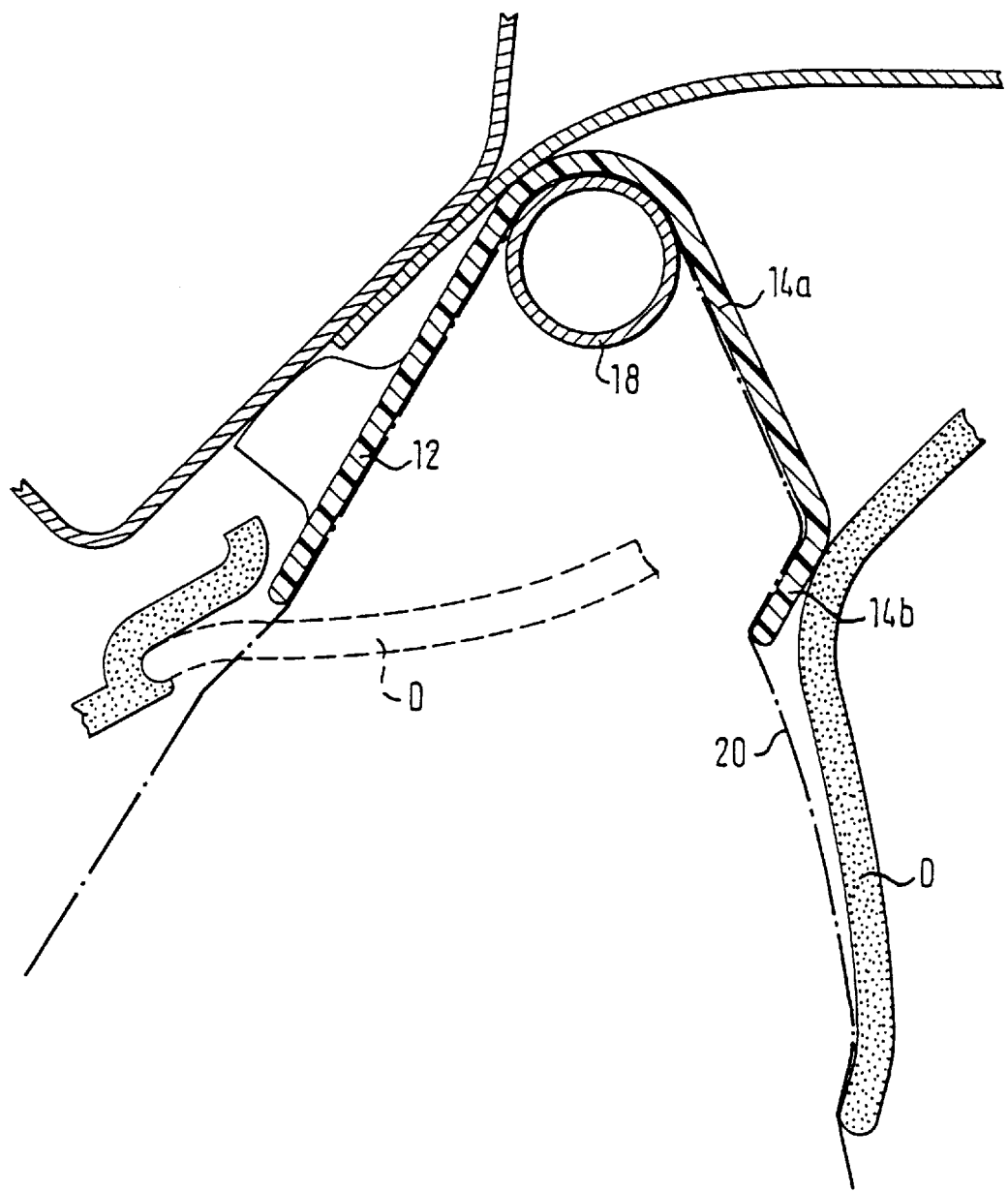
FIG. 6 is a schematic cross-sectional view on a magnified scale illustrating the protective means in the activated condition as jointed to the vehicle.

The profile part 32 is preferably connected articulatedly to the adjacent end of the receiving housing 10, thus enabling it to be folded against the receiving housing as evident from FIG. 5, this configuration considerably simplifying storage and transportation.

When the gas bag is activated compressed gas is blown into its chambers via the gas inlet tube 18 from the source of compressed gas 26, the gas inlet tube being provided with a plurality of gas exit ports distributed over its length. This results in an expansion pressure developing in the interior of the receiving housing causing the housing legs to be spread apart, the roof cover D of the vehicle simultaneously being released from its anchorage and pushed open. Since the flat leg 12 of the receiving housing is supported by the contact surface of the roof edge, the opposite housing leg is deflected with the strips 14a and 14b by the expanding gas bag. This deflection occurs against the resistance formed by both the inherent stiffness of the receiving housing and by the deforming roof cover D in the vehicle. Due to this resistance a pressure is exerted on the expanding gas bag 20 downwards and thus the gas bag expands primarily downwards in the initial phase of its expansion. In cooperation with the roof cover D in the vehicle an orienting effect is achieved accordingly by the configuration of the receiving housing 10, this effect preventing the gas bag from expanding in the direction of the vehicle occupant.

Depending on the requirements of the vehicle, various configurations of the gas bag are possible which require no changes in the region of the receiving housing 10 or profile part 32.

Accordingly, FIG. 7a shows a gas bag having the sail-type projection 30, as already described, a chamber 20a adjoining thereto, divided by two constrictions 40 into three compartments, a recessed portion 42 which is not inflated and consists, for example, of two interwoven plies of fabric, a further chamber 20b, a portion 44 likewise recessed and a rear chamber 20c divided into two compartments by a constriction 46. Via the tensioning strap 28 connected to the C pillar and the front end of the projection 30 anchored at the bottom to the A pillar, this gas bag is tensioned in the inflated condition between the cited pillars of the vehicle. Due to the side expansion of the chambers 20a, 20b and 20c a shortening in the effective length of the gas bag occurs as compared to its condition when not inflated. This contraction in length produces the tensioning between the A pillar and the C pillar.

As is furthermore evident from FIG. 7a, slot-shaped portions 47, 48 are recessed along the upper edge of the gas bag 20, it being through these slot-shaped portions that the lead-through sleeves 22 are guided, thus making it possible to undertake securing the receiving housing 10 through the gas bag. The slot shape permits the already described longitudinal contraction of the gas bag on inflation.

The variant as shown in FIG. 7b differs from that as shown in FIG. 7a merely by the tensioning strap 28 which is not secured to the rear end of the gas bag but to the recessed portion 44.

In the case of the variant as shown in FIG. 7c the front projection 30 is replaced by a tensioning strap 50, this strap 50 being receivable in the flat profile part 32 like the projection 30.

Figure 8:
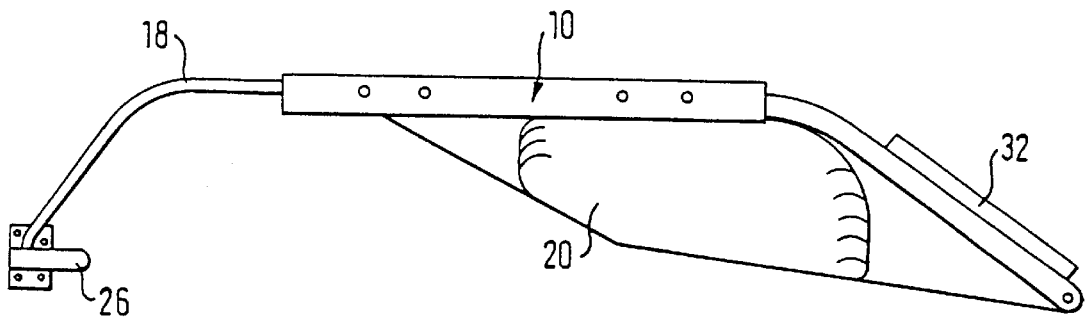
FIG. 8 shows a second embodiment of the protective means.

FIG. 8 shows an embodiment in which the gas bag 20 extends over the portion between the A pillar and the B pillar of the vehicle when inflated. Despite this, the gas inlet tube 18 is elongated up to the C pillar at which the source of compressed gas 26 is arranged.

Figure 9A:
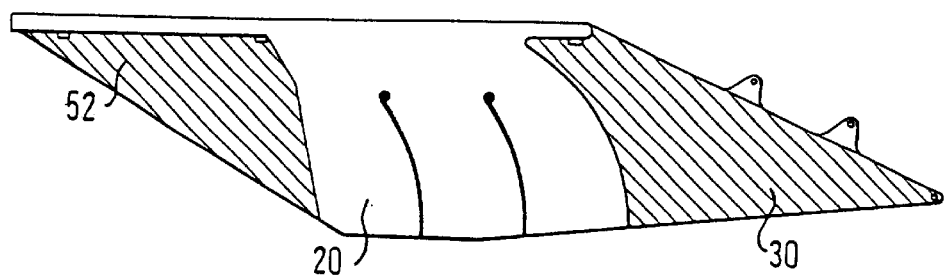
FIGS. 9a and 9b are two design variants of a gas bag in the embodiment as shown in FIG. 8.
Figure 9B:
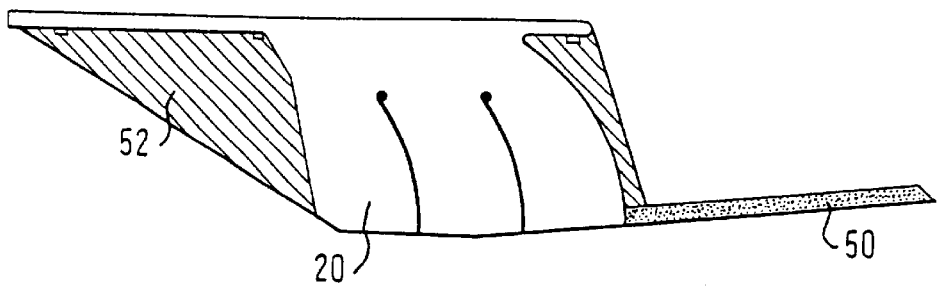

In the embodiment of the gas bag as shown in FIG. 9a a sail-type projection 30 is in turn provided. In the embodiment as shown in FIG. 9b this projection is replaced by a tensioning strap 50. The receiving housing 10 has the same cross-sectional shape as the embodiment described above, likewise the flat profile part 32; but the receiving housing 10 has a reduced length and no, or only a very slight, curvature. Instead of the tensioning strap 28 a sail-type projection 52 is provided in these two variants, this projection being analogous to the projection 30 and featuring both a protective function as well as a tensioning function.

What is claimed is:

1. An inflatable vehicle occupant protective means mounted in the roof edge of a vehicle for helping to protect the head and thorax of a vehicle occupant in a side impact collision, said protective means comprising:
    an elongated receiving housing having a channel-shaped cross-section,
    at least one inflatable gas bag which is folded and stored in said receiving housing,
    a source of compressed gas to provide gas for inflating said gas bag, and a gas inlet tube extending substantially into said gas bag and having a plurality of spaced-apart gas exit ports through which gas flows to inflate said gas bag, said channel-shaped cross-section including a first flat leg, a second leg having a first flat strip and a second strip which is angled relative to said first strip, and a web for joining said first and second legs, said second strip having an oblique orientation relative to said first leg, and at least one lead-through sleeve passing through said receiving housing for receiving a fastener for attachment to the vehicle, said lead-through sleeve passing through a defined portion of said gas bag which does not inflate, said defined portion of said gas bag being a slot extending in the longitudinal direction of the gas bag.

2. An inflatable vehicle occupant protective means mounted in the roof edge of a vehicle for helping to protect the head and thorax of a vehicle occupant in a side impact collision, said protective means comprising:

an elongated receiving housing having a channel-shaped cross-section, at least one inflatable gas bag which is folded and stored in said receiving housing, a source of compressed gas to provide gas for inflating said gas bag, and a gas inlet tube extending substantially into said gas bag and having a plurality of spaced-apart gas exit ports through which gas flows to inflate said gas bag, said channel-shaped cross-section including a first flat leg, a second leg having a first flat strip and a second strip which is angled relative to said first strip, and a web for joining said first and second legs, said second strip having an oblique orientation relative to said first leg, and at least one lead-through sleeve passing through said receiving housing for receiving a fastener for attachment to the vehicle, and two pairs of lead-through sleeves for receiving two pairs of grab-handle fastener studs.

3. An inflatable vehicle occupant protective means mounted in the roof edge of a vehicle for helping to protect the head and thorax of a vehicle occupant in a side impact collision, said protective means comprising:

an elongated receiving housing having a channel-shaped cross-section, at least one inflatable gas bag which is folded and stored in said receiving housing, a source of compressed gas to provide gas for inflating said gas bag, and a gas inlet tube extending substantially into said gas bag and having a plurality of spaced-apart gas exit ports through which gas flows to inflate said gas bag, said channel-shaped cross-section including a first flat leg, a second leg having a first flat strip and a second strip which is angled relative to said first strip, and a web for joining said first and second legs, said second strip having an oblique orientation relative to said first leg, and at least one lead-through sleeve passing through said receiving housing for receiving a fastener for attachment to the vehicle, said lead-through sleeve having a widened portion located flush with said first strip of said second leg.

4. An inflatable vehicle occupant protective means mounted in the roof edge of a vehicle roof for helping to protect the head and thorax of a vehicle occupant in a side impact collision, said protective means comprising:

an elongated receiving housing having a channel-shaped cross-section, at least one inflatable gas bag which is folded and stored in said receiving housing, a source of compressed gas to provide gas for inflating said gas bag, and a gas inlet tube extending substantially into said gas bag and having a plurality of spaced-apart gas exit ports through which gas flows to inflate said gas bag, said channel-shaped cross-section including a first flat leg, a second leg having a first flat strip and a second strip which is angled relative to said first strip, and a web for joining said first and second legs, said second strip having an oblique orientation relative to said first leg, and at least one lead-through sleeve passing through said receiving housing for receiving a fastener for attachment to the vehicle, said lead though sleeve having a flange recessed in said first leg.

5. An inflatable vehicle occupant protective means mounted in the roof edge of a vehicle for helping to protect the head and thorax of a vehicle occupant in a side impact collision, said protective means comprising:

an elongated receiving housing having a channel-shaped cross-section, at least one inflatable gas bag which is folded and stored in said receiving housing, a source of compressed gas to provide gas for inflating said gas bag, and a gas inlet tube extending substantially into said gas bag and having a plurality of spaced-apart gas exit ports through which gas flows to inflate said gas bag, said channel-shaped cross-section including a first flat leg, a second leg having a first flat strip and a second strip which is angled relative to said first strip, and a web for joining said first and second legs, said second strip having an oblique orientation relative to said first leg, said gas bag including a sail projection which is tensed in response to inflating said gas bag, said receiving housing including a flat profile part and a slot-shaped receiving conduit formed in said flat profile part.

6. The protective means according to claim 5 wherein said flat profile part includes a molded-on receiving conduit having a U-shaped cross-section.

7. The protective means according to claim 6 wherein said receiving conduit is defined by two elastically deflectable legs.

8. The protective means according to claim 5 further including at least one latching pin molded on said profile part.

9. The protective means according to claim 5 wherein said profile part is movably connected to an adjacent end of said receiving housing.

10. An inflatable vehicle occupant protective means mounted in the roof edge of a vehicle for helping to protect the head and thorax of a vehicle occupant in a side impact collision, said protective means comprising:

an elongated receiving housing having a channel-shaped cross-section, at least one inflatable gas bag which is folded and stored in said receiving housing, a source of compressed gas to provide gas for inflating said gas bag, and a gas inlet tube extending substantially into said gas bag and having a plurality of spaced-apart gas exit ports through which gas flows to inflate said gas bag, said channel-shaped cross-section including a first flat leg, a second leg having a first flat strip and a second strip which is angled relative to said first strip, and a web for joining said first and second legs, said second strip having an oblique orientation relative to said first leg, said gas bag in an inflated condition covering a side pane portion between an A pillar of the vehicle and a C pillar of the vehicle, said gas bag including a sail-type projection anchored to the A pillar, a first chamber portion adjoining the projection, said chamber portion extending up to a B pillar of the vehicle, a second chamber portion spaced away from the C pillar, and a third chamber portion spaced away from said second chamber portion towards the C pillar and connected by a tensioning strap.

11. An inflatable vehicle occupant protective means mounted in a roof edge of the vehicle for helping to protect the head and thorax of a vehicle occupant in a side impact collision, said protective means comprising:

an elongated receiving housing having a channel-shaped cross-section, at least one inflatable gas bag which is folded and stored in said receiving housing, a source of compressed gas to provide gas for inflating said gas bag, and a gas inlet tube extending substantially into said gas bag and having a plurality of spaced-apart gas exit ports through which gas flows to inflate said gas bag, said channel-shaped cross-section including a first flat leg, a second leg having a first flat strip and a second strip which is angled relative to said first strip, and a web for joining said first and second legs, said second strip having an oblique orientation relative to said first leg, said receiving housing having hook-shaped hang-in elements molded onto one of said first and second legs.

12. An inflatable vehicle occupant protective means mounted in the roof edge of a vehicle for helping to protect the head and thorax of a vehicle occupant in a side impact collision, said protective means comprising:

an elongated receiving housing having a channel-shaped cross-section, at least one inflatable gas bag which is folded and stored in said receiving housing, a source of compressed gas to provide gas for inflating said gas bag, and a gas inlet tube extending substantially into said gas bag and having a plurality of spaced-apart gas exit ports through which gas flows to inflate said gas bag, said channel-shaped cross-section including a first flat leg, a second leg having a first flat strip and a second strip which is angled relative to said first strip, and a web for joining said first leg to said second leg at a first end, said first and second legs having free opposite ends which are not joined together, said second strip having an oblique orientation relative to said first leg, said second leg deflecting from said oblique orientation relative to said first leg to a displaced orientation relative to said first leg during inflation of said gas bag due to the force exerted by the gas through the gas exit ports, said second leg deflecting against the resistance due to the stiffness of said receiving housing.

13. The protective means according to claim 12 wherein said web joining said first and second legs has a contour shape which is adapted to an outer contour shape of said gas inlet tube.

14. The protective means according to claim 12 further comprising at least one lead-through sleeve passing through said receiving housing for receiving a fastener for attachment to a vehicle.

15. The protective means according to claim 14 wherein said lead-through sleeve passes through a defined portion of said gas bag which does not inflate.

16. The protective means according to claim 14 wherein said gas inlet tube is retained between said web connecting said first and second legs and said lead-through sleeve.

17. The protective means according to claim 12 wherein said gas bag includes a sail projection which is tensed in response to inflating said gas bag.

18. The protective means according to claim 12 wherein said gas bag in an inflated condition covers a side panel portion between an A pillar and a C pillar of a vehicle.

19. The protective means according to claim 18 wherein said gas inlet tube protrudes from said receiving housing and extends to the gas source arranged in said C pillar.

20. The protective means according to claim 18 wherein said gas bag in the inflated condition covers a side panel portion between said A pillar and a B pillar of said vehicle, and that said gas inlet tube protrudes from said receiving housing and extends to the gas source arranged in said C pillar.

21. The protective means according to claim 12 wherein said receiving housing comprises an injection molded synthetic material.

22. The protective means according to claim 12 wherein said first and second legs of said receiving housing are elastically movable.

* * * * *